Jan. 10, 1956   A. F. CASLER ET AL   2,729,916
GLASS BLOWING MACHINE
Filed March 17, 1951   3 Sheets-Sheet 2
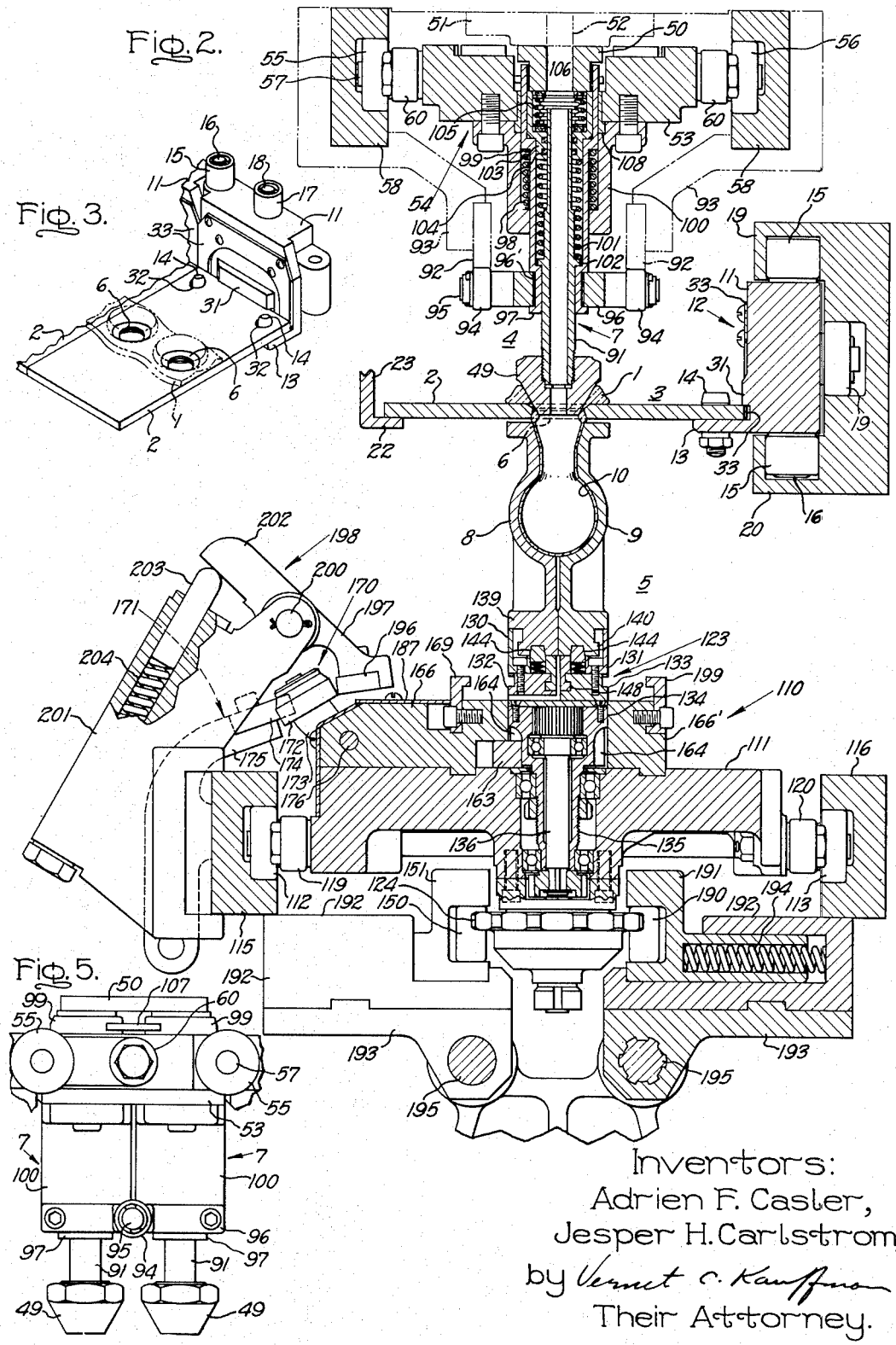
Inventors:
Adrien F. Casler,
Jesper H. Carlstrom,
by Vernet C. Kauffman
Their Attorney.

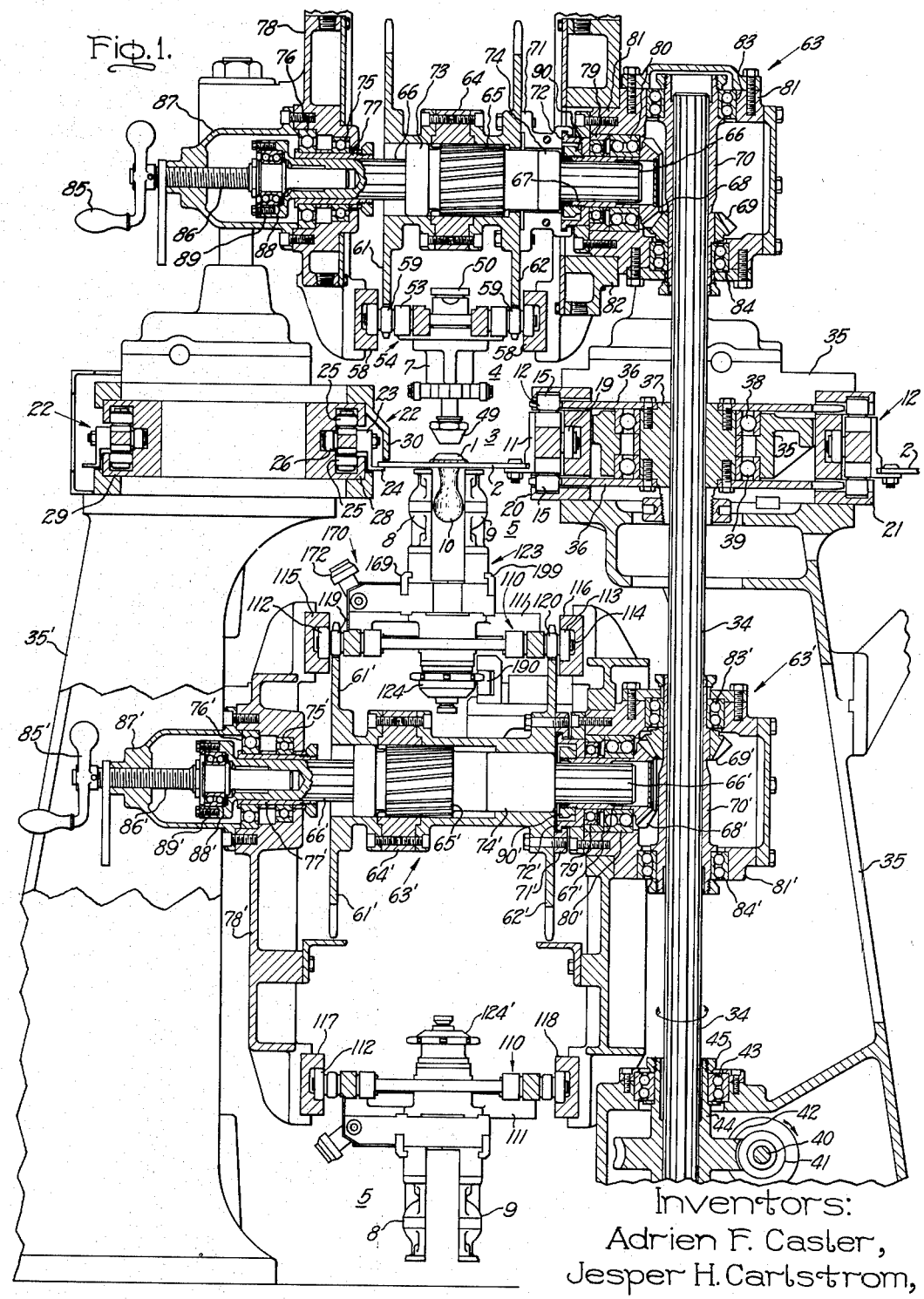

Jan. 10, 1956  A. F. CASLER ET AL  2,729,916
GLASS BLOWING MACHINE
Filed March 17, 1951  3 Sheets-Sheet 3
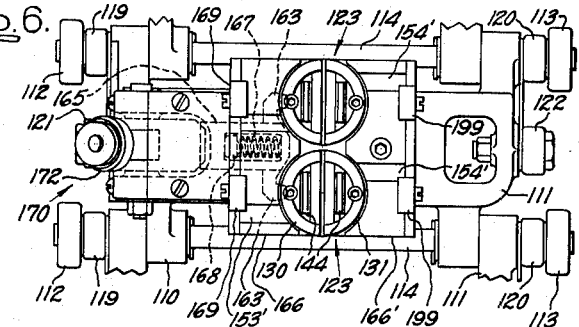
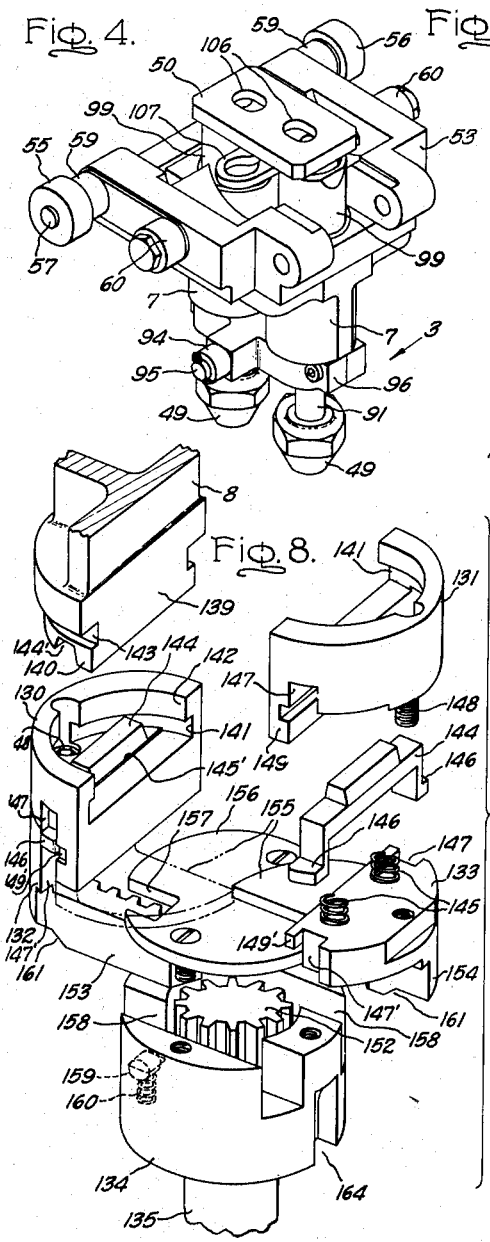
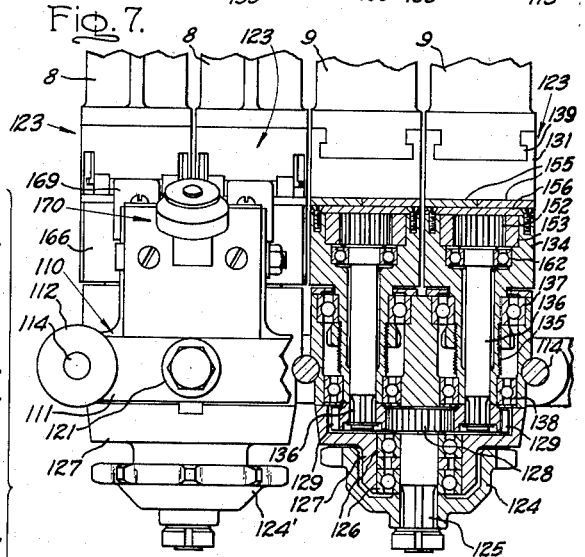
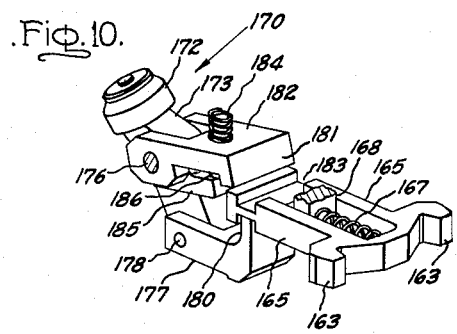
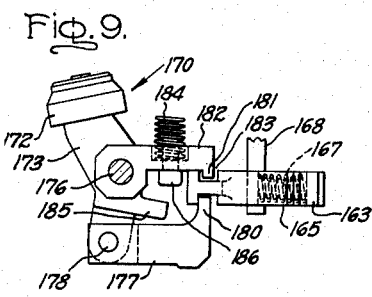
Inventors:
Adrien F. Casler,
Jesper H. Carlstrom,
by Vernet C. Kauffman
Their Attorney.

United States Patent Office 2,729,916
Patented Jan. 10, 1956

2,729,916

GLASS BLOWING MACHINE

Adrien F. Casler and Jesper H. Carlstrom, East Cleveland, Ohio, assignors to General Electric Company, a corporation of New York Application March 17, 1951, Serial No. 216,204

4 Claims. (Cl. 49—19)

Our invention relates to machines for blowing glass articles and, more particularly, to glass blowing machines which form blown articles from plastic glass while carrying the glass along an extended horizontal path.

One particular species of machine to which our invention relates is exemplified by the glass blowing machine shown in Patent 1,790,397, W. J. Woods et al., dated January 27, 1931, and comprised of a plurality of endless belt-like conveyors or carriers moving continuously and contiguously along an operative run and adapted to advance the plastic glass, and including cooperating blowing and molding elements at operative relation to each other and to the glass along said run. In the most common form of such machines, the plastic glass is in the form of a continuous strip or ribbon flowing from a furnace and is supported by a flat horizontal surface constituted by the operative run of an endless belt conveyor. Openings at regular intervals along the length of the conveyor permit portions of the glass ribbon to sag; and blow heads and molds, located above and below said conveyor on belt-like carriers moving in parallel operative runs, expand and shape the sagging portions to the form desired. That portion of the glass ribbon still retained by the conveyor after the formation of the articles is not directly utilized, but must be returned to the furnace and remelted, so that it constitutes an unavoidable expense in this manner of blowing glass articles.

One object of our invention is to effect the blowing of articles from a ribbon of glass in a manner which will keep the unused ribbon or cullet at a minimum. To this end, means are provided for blowing articles from very closely spaced portions of the glass ribbon.

Another object of our invention is to provide means for blowing articles at relatively short pitch or center-to-center distance from a ribbon of plastic glass to enable small sized articles such as miniature electric lamp bulbs to be blown from said ribbon without excessive cullet. The shortness of the pitch of such glass blowing means also enables a greater number of heads to be built into a single machine with the result that higher rates of production as well as greater economy are experienced by the use of such means.

A salient feature of our invention is the mounting of a plurality of blow-heads and mold carriers in groups on respective individual links of respective articulated carriers. As herein illustrated, the blow-heads and mold carriers are arranged in groups of two on the respective links. Still other advantages of our apparatus are presented by novel combined mold operating and rotating means, and readily separable coupling arrangements for attaching the molds to said means. The several improvements comprising our invention particularly adapt the apparatus to speeds of operation much greater than possible heretofore, and enable more satisfactory operation of the blowing machine and also more rapid repair thereof.

Further features and advantages of our invention will appear from the following detailed description and from the accompanying drawing of a preferred embodiment.

In the drawing, Fig. 1 is a sectional elevation, transversely of a bulb blowing machine embodying our invention, showing the main drive stands and associated drives for supporting and advancing the ribbon conveyor and the blow-head and mold carriers; Fig. 2 is a vertical section on the center of one head of the machine showing, in greater detail and at the moment of completion of a glass bulb, the ribbon conveyor, the blow-head and mold carriers and the immediately associated operating means; Fig. 3 is a perspective view of an orifice plate and a link making up one section of the ribbon conveyor; Figs. 4 and 5 are perspective and elevation views, respectively, of one of the links and associated means making up the blow-head carrier; Fig. 6 is a plan view of one of the links and associated means making up the mold carrier; Fig. 7 is a side elevation on a larger scale of two links and associated means of the mold carrier, the means associated with one link being broken substantially through the center to show operating elements of the two mold holding spindle assemblies associated therewith; Fig. 8 is an exploded perspective view on a still larger scale of the head end of one of the mold holding spindle assemblies and the adjacent end of one of the mold halves; and Figs. 9 and 10 are side and perspective views, respectively, of a mold triggering means of one link of the mold carrier, said means being shown in disengaged and engaged positions, respectively.

As in the operation of other ribbon machines hereinbefore referred to, a ribbon 1 of plastic glass rests upon the flat orifice plates of a ribbon conveyor 3 and is advanced horizontally along an operative run (in a direction toward the viewer of Figs. 1 and 2) between corresponding runs of blow-head and mold carriers 4 and 5, respectively. All of these three major components, ribbon conveyor 3, blow-head carrier 4 and mold carrier 5, are in the form of endless belts or chains having a course of motion which advances portions thereof continuously along parallel runs and having a rate of movement maintaining the cooperative relation of specific elements of each as shown. The glass ribbon 1 is placed upon the horizontal surface presented by the succession of orifice plates 2 of the ribbon conveyor 3 at the start of the run, and in the course of the advance of said plates 2, the glass sags down through the orifices 6 therein. Further along the course of movement, as is usual in ribbon machines, the blow-head carrier 4 moves a blow-head 7 down into cooperative relationship to the ribbon 1 and the opening 6 in the orifice plate 2, and the mold carrier 5 brings the mold halves 8 and 9 up around the sagging glass of the ribbon 1. After the blowing operation, the blow-head and mold carriers 4 and 5 are separated from the ribbon 1 and the article 10 is broken from the unusable body of said ribbon 1 remaining upon the upper surface of the ribbon conveyor 3. A more detailed explanation of the operation and cooperative functions of all elements of the machine relating to our invention appears in the following disclosure which is separated into sections referring to the ribbon conveyor 3, the blow-head carrier 4, and the mold carrier 5.

The ribbon carrier

The ribbon 1 of glass in our preferred embodiment disclosed is carried by a succession of flat orifice plates 2, each coupled to a separate link 11 of the chain 12 of ribbon conveyor 3 and each having a pair of openings or orifices 6 (Fig. 3) located along the course of movement at the position of two successive heads of the machine. The orifices 6, 6 in each plate 2 are spaced at the same relation as adjacent openings 6, 6 in successive plates 2 in the conveyor 3 and in that arrangement establish a uniform succession of heads in the machine. The paired arrangement of the orifices 6, 6 provides for a very close relation between heads, which is very desirable to the manufacture of small articles, with less complex and more satisfactory machine construction. Each orifice plate 2 is carried on a lip 13 and two upstanding studs 14, 14 on the bottom edge of the link 11 of the chain 12 which follows a course of movement determined by four corresponding rollers 15 on the upper and lower ends of hinge pins 16, 16 at opposite ends of each link 11, two corresponding rollers 17 on the upper and lower ends of a pin 18 extending through said link 11 midway between the hinge pins 16, 16, and a single roller 19 at the center of the back of said link 11. During the operative run of chain 12 of ribbon conveyor 3, the rollers 15, 17 and 19 ride in channels in a horizontal rail 20 extending longitudinally of the machine, and during the return run of chain 12, said rollers ride in corresponding channels of a second rail 21 laterally disposed from the first rail 20.

The orifice plates 2 also receive additional support during their passage along the operative run of the conveyor 3 from a support chain 22 located correspondingly on the opposite side of the machine from conveyor chain 12 and providing links 23 having outwardly projecting lips 24 forming a rest for said plates 2. The support chain 22 moves in synchronism with and at the same rate of speed as the orifice plates 2 in runs parallel to and laterally disposed therefrom and is guided in its course of travel by rollers 25 and 26 corresponding to rollers 15 and 19 on links 11 of chain 12 and engaging guide rails 28 and 29 along the operative and return runs, respectively, thereof. An outwardly projecting guard 30 on rail 28 above the operative course of travel of the lips 24 on links 23 prevents the orifice plates 2 from being lifted out of position. This latter construction is particularly desirable in that the orifice plates 2 are kept down against the lips 13 of links 11 only by the overhanging shoulders 31 thereon and are removed from the lips 13 by lifting the free end so that the opposite end can slip over the upper ends of studs 14, 14 and pass out from under said shoulder 31. Elongated holes 32 in the orifice plates 2 provide clearance for the studs 14, 14 at such times. The constant pressure of the ends of U-shaped leaf springs 33 pressing against the edges of the orifice plates 2 keep said orifice plates 2 at one position during operation of the machine.

The orifice plate holding chain 12 and the support chain 22 of the ribbon conveyor 3 are advanced by the main driving means of the machine providing a splined vertical drive shaft 34 between the runs of the orifice plate holding chain 12 and providing a drive shaft (not shown) correspondingly positioned between the runs of support chain 22 in the manner of the prior apparatus hereinbefore referred to. The vertical drive shaft 34 is encased in one of a plurality of support stands 35 and 35' located along both sides of the machine in the manner of said prior apparatus and corresponds to driving means of said machines.

As shown in Fig. 1, a pair of sprockets 36, 36 attached to a hub 37 on the vertical drive shaft 34 extend through slits in the guide rail 20 and drive chain 12 through engagement with the rollers 15 and 17 along the length thereof. The hub 37 also assists in holding the vertical drive shaft 34 and sprockets 36, 36 in position in that it is journalled in the ball bearings 38, 39 carried by a cross member of the support stand 35. Motion is transferred to the vertical drive shaft 34, in turn, from a main drive shaft 40 at the base of the stand 35 and imparting motion thereto through meshing worm gear 41 and worm wheel 42. A ball bearing 43 in the lower portion of the stand 35 holds the adjacent portion of the vertical drive shaft 34 and the worm wheel 42 in place through its engagement with the hub 44 of the latter and the nut 45 on the end of said hub 44. The vertical drive shaft for the ribbon conveyor support chain 22 is similar to drive shaft 34 and is not shown in the present disclosure because of the associated complex support means similar to that associated with drive shaft 34 and not relevant to this invention. The interconnected drive (not shown) between the drive shaft 34 and the drive shaft for the support chain 22 assures the proper rate of movement of the latter.

The blow-head carrier

The carrier 4 located immediately above the ribbon conveyor 3 provides the means of advancing blow heads 7 into alignment with each of the openings 6 in the orifice plates 2 and, while maintaining the alignment, causes the tips 49 thereof to seat on the glass ribbon 1. The course of the movement of the blow-heads 7, as in the prior patented apparatus hereinbefore referred to, parallels the operative run of the ribbon conveyor 3 and advances the shoes 50 on the upper portion of said blow-heads 7 along the lower surface of a blow box 51 (indicated in Fig. 2) having openings 52 for communicating the blowing air thereto. As shown in Figs. 2, 4, and 5, a pair of blow-heads 7, 7 are mounted on each link 53 of a chain 54 at the same spaced relationship as the openings 6 in each orifice plate 2, and stepped rollers 55, 56 are provided on the opposite ends of hinge pins 57 for engagement with the channel ways in tracks 58 fixing the path of movement of said blow-heads 7. The step down, or reduced, portions 59 of the rollers 55 and 56, together with the rollers 60 on opposite sides of the midportion of the links 53, enable the sprockets 61 and 62 (Fig. 1) of driving means to engage and advance the blow-head carrier 4.

During normal periods of operation of the machine, a positive drive is provided between the blow-head carrier 4 and the main driving means of the machine (the vertical drive shaft 34) by the sprockets 61 and 62 and the other elements of the cross drive 63. However, provision is made in the cross drive 63 to allow the blow-head carrier 4 to be bodily advanced or retracted short distances with respect to the drive to permit the blow-heads to be adjusted manually into proper aligned relation to the openings 6 in the orifice plates 2 of the ribbon conveyor 3. The adjustment means does not disturb the driving force which is transmitted to the sprockets 61 and 62 through the supporting sleeve 64 which has internal teeth which mesh snugly with corresponding spiral teeth on the hub 65 which is fitted over a splined cross shaft 66. The splined cross shaft 66, in turn, receives motion from the internally splined hub 67 of the bevel gear 68 which meshes with a second bevel gear 69 on a sleeve 70 meshing with the splines of the vertical drive shaft 34. Also included in the drive is a split collar 71 fastened to the outer face of the sprocket 62 and engaging a flange of a collar 72 on the hub 67 of bevel gear 68. The interlocked relation of the collars 71 and 72 fixes the lateral position of the sprockets 61 and 62 in the apparatus. The hub 65 is similarly fixed along the splines of the cross shaft 66 by collars 73 and 74 fastened to said shaft 66 and located against respective ends of the hub 65. Ball bearings 75, 76, sleeve 77 and the bracket 78 provide, in combination with other means associated with the stand 35', the support for the outboard or free end of the cross shaft 66; whereas, the hub 67 of bevel gear 68, ball bearings 79 and 80, the gear box 81 and the bracket 82, in combination with other means associated with stand 35, provide the support for the end of the cross shaft 66 adjacent the main vertical drive shaft 34. Bearings 83 and 84 within other portions of the gear box 81 support the adjacent end of the vertical drive shaft 34 through engagement with the sleeve 70 surrounding said portion of said shaft 34.

The adjustment means hereinbefore referred to for the blow-head carrier 4 and incorporated within the cross drive 63 is actuated by the hand crank 85 on the end of a screw threaded spindle 86 extending beyond the free end of the cross shaft 66 and has the function of moving said shaft 66 and the hub 65 longitudinally so that the angularity of the intermeshing teeth in the sleeve 64 and the matching grooves (spiral keyway) in hub 65 effect a graduated rotation of the sprockets 61 and 62 with respect to the drive and a suitable advancement or retraction of the blow-head chain 54. The spindle 86 is threaded in the cap 87 covering the end of the shaft 66 projecting beyond the bracket 78 and, when turned into or out of cap 87 effects the longitudinal movement of the cross shaft 66, inasmuch as the bearing 88 and other associated means, in the flared end 89 of said cross shaft 66, allow free rotative motion but prevent relative longitudinal motion between spindle 86 and shaft 66. Lateral motion of the sprockets 61 and 62 and the sleeve 64 are prevented at such times by the engagement of the collar 71 with the flange of collar 72 which is clamped to the hub 67 of bevel gear 68 by the nut 90.

Each blow-head 7 on a link 53 of the carrier 4, as shown in Figs. 1, 2, and 4 passes blowing air to the top surface of the glass ribbon 1 lying over and sagging down through one of the openings 6 in the orifice plates 2 of the conveyor 3 and effects the transmission of the blowing air through a conical tip 49 on the lower end of a hollow spindle 91, which tip is lowered part way into the opening 6 in plate 2. The construction and manner of operating the blow-heads 7 corresponds closely to that disclosed in greater detail in the United States patent 2,184,900 issued December 26, 1939, to Snyder and in accord therewith provides for the downward movement of the tip 49 and spindle 91 during the motion of the blow-head carrier 54 along the operative run thereof adjacent the glass ribbon 1 and the ribbon conveyor 3.

Both blow-heads 7 mounted on each link 53 of the blow-head carrier 4 are operated simultaneously by stationary cam tracks 92, 92 (indicated in Fig. 2) on brackets 93, 93 along the initial portion of the run thereof and at a time when the motion of said carrier 4 carries the rollers 94, 94 on the pin 95 retained by the clamp 96 over onto the lowest portions of said cams 92, 92. The clamp 96 is located between opposed shoulders of reduced or neck portions 96' of the sleeves 97, 97 surrounding respective blow-head spindles 91, 91 of both blow-heads 7 on each link 53 and is moved against the constant expansion pressure of helical springs 98 in respective blow-heads. Said springs 98 extend between the enlarged upper ends 99 of the sleeves 97 and the caps 100 extending from the carrier link 53. The effect of the springs 98 is to lift the sleeves 97 and the spindles 91 to the normal rest positions (Figs. 1 and 5) of this means where the clamp 96 bears against the lower end of the caps 100 where the tip 49 is above the glass ribbon 1. Each spindle 91 normally follows the movements of the associated sleeve 97 for almost the full distance of travel as the constant pressure of helical spring 101 is usually sufficient to keep the shoulders 102 on said spindle 91 forced downward against the adjacent shoulder in the sleeve 97 except at the very limit of motion thereof. The spindle 91 can be forced upward within the sleeve 97 against the force of spring 101 should the tip 49 come to bear upon a nonplastic inclusion in the glass ribbon 1. The upper end of the spring 101 presses against a second cap 103 seating against the lower surface of the shoe 50 and, in combination with the packing rings 104 and the spring-backed bellows type packing gland 105, seal the upper end of the spindle 91 to said shoe 50. Both heads on each link 53 are accommodated by a single shoe 50 having separate passages 106, 106 therethrough in communication with each spindle 91.

The downward motion created in each spindle 91 to cause the blow-head tip 49 to seat on the glass ribbon 1 also effects a lowering movement of the shoe 50 inasmuch as a U-shaped key 107 locks the depending portions of the shoe 50 to the enlarged upper ends 99 of the sleeves 97 of paired heads by its presence in aligned transverse notches in said depending portions and said enlarged upper ends 99. The shoe 50 is then in position to pass under the blow-box 51 located further along the run of the carrier 4 and almost immediately moves upward again until it rubs against the lower surface of said blow-box 51 as the rollers 94 pass off the ends of cams 92 and the sleeves 97 travel upward under the influence of springs 98. The latter motion normally does not disturb the position of the blow-head spindle 91 inasmuch as the movement is small and closes up a small space between the shoulder 102 thereon and the adjacent shoulder in the sleeve 97.

In the course of the movement of the blow-heads, the shoe 50 advances along the blow-box 51 and the respective passages 106 therein register, in turn, with like passages indicated at 52 for supplying the blow air thereto. The flexibility of the bellows packing 105 on each head in each link 53 permits the shoe 50 to seat perfectly on the blow-box 51 at all times without affecting the alignment of the spindles 91 and the sleeves 97. The positions of the blow-heads, including their spacing, is determined only by the links 53. Said links are made of the same material (Invar alloy) as the links 11 of ribbon conveyor 12 so that their relative positions are unaffected by variations in temperature and they maintain their alignment at all times. The position of the blow-heads is fixed by the engagement of sleeve 97 with the bushing 108 and the cap 100 and is not affected by any lateral expansion or motion in the clamp 96 because of clearance or play provided between the shank 96' of the sleeve 97 and said clamp 96.

Near the end of the operative run of the blow-head carrier 4 where the bulb 10 is completely blown to shape, the shoe 50 on the blow-heads 7, 7 passes onto an upwardly sloping portion of the lower surface of the blow box 51 and then beyond the end thereof. This motion of the shoe 50 allows it and the blow-head 7 to be forced upward by the expansion force of spring 98 and raises the blow-head tip 49 to an elevated position above the glass ribbon 1. The blow-heads 7 have then completed the operative run and swing upward into a return run of the carrier 4 (not shown) located directly over the operative run, which return run carries them back to the start of another cycle of operation.

The mold carrier

The mold halves 8 and 9 follow the blow-heads in taking an operative position in relation to the glass ribbon 1 and are swung, while separated from each other, to positions on opposite sides of the glass gob sagging through the opening 6 of the orifice plate 2 in the manner of the apparatus disclosed in Patent 1,790,397 hereinbefore referred to. The positioning of the mold halves 8 and 9 occurs at a position substantially midway along the operative run of the ribbon conveyor 3 when the endless chain 110, the main supporting member of the mold carrier 5, enters a parallel run to that of the ribbon conveyor 3. Cooperating mold halves 8 and 9 are mounted in pairs on each of the links 111 (Figs. 1, 2, 6, and 7) comprising the chain 110 and have a direction of movement determined by the engagement of the rollers 112 and 113 on the opposite ends of hinge pins 114 joining successive links 111. The rollers 112 and 113 ride in channels in upper rails 115 and 116, respectively, along the operative run, and pass into engagement with the lower rails 117 and 118, respectively, on the return run thereof, also in the same manner as the corresponding apparatus disclosed in Patent 1,790,397 hereinbefore referred to.

The mold carrier 5 in the present instance is advanced by the sprockets 61' and 62' of a cross drive 63' in turn driven from the vertical drive shaft 34 and corresponding to the cross drive 63 associated with the blow-head carrier 4. The sprockets 61' and 62' engage rollers 119 and 120, respectively, which are located adjacent rollers 112 and 113, respectively, on the hinge pins 114 between links 111 and other rollers 121 and 122 (Figs. 6 and 7) intermediate said hinge pins 114 and on opposite sides of said links 111. Like all other parts of the cross drive 63', the sprockets 61' and 62' are numbered with primed numbers corresponding to the numbers of the corresponding part in the cross drive 63 and permit both the moving effort transmitted from vertical shaft 34 and the adjustment forces originating in crank 85' to be transferred to the chain 110.

The mold halves 8 and 9 making up each mold are mounted upon one end of a spindle assembly 123 which is rotatable within the link 111 of the mold carrier 5 and are grouped with other mold halves 8 and 9 for a second mold and a second spindle assembly 123 in each link 111. The manner of pairing the molds in separate links 111 of the carrier 110 corresponds to the pairing of the openings 6, 6 in the orifice plates 2 of the ribbon conveyor 3 and the pairing of the blow-heads 7, 7 in the links 53 of the blow-head carrier 4 (the other parts of the heads of the machine) and in the present instance, enables the rotation of the single drive sprocket 124 (or 124' on alternate links 111) located upon the opposite face of the links 111 to be used to operate pairs of molds. As best seen in Fig. 7, the sprocket 124 associated with one link 111 is mounted fast on the splined end of a spindle 125 carried by ball bearings 126, 126 in a bell housing 127 over the inner face of said link 111 and transmits motion to corresponding spur gears 129, 129 of the spindle assemblies 123, 123 associated with respective molds on link 111 through a spur gear 128 on the opposite end of said spindle 125. The cooperating mold halves 8 and 9 of each mold are retained by separate sections 130 and 131 of a quickly releasable coupling carried on two separable segments 132 or 133 (Fig. 8), respectively, of the head end 134 of a mold support spindle 135 and are opened and closed or rotated, as the case may be, during the operation cycle by the separate rotation effected by gear 129 in the shaft 136 within the hollow center of the mold support spindle 135 or by the combined rotation effected in the shaft 136 and the mold support spindle 135 by said gear 129 at other times. Support for each spindle assembly 123 is present in the ball bearings 137 and 138 which engage spaced portions of the mold support spindle 135 removed from the head end 134 thereof.

The mold halves 8 and 9 are subject to ready replacement and substitution in the respective coupling sections 130 and 131 of the spindle support assembly 123 which are engaged through generally semicircular feet 139 fitting into correspondingly shaped pockets in said coupling sections 130 and 131. A flange 140 (Fig. 8) about the curved end portion of the foot 139 of each mold half 8 or 9 extends into a recess or groove 141 about the pocket in the coupling section 130 or 131; and an inwardly extending lip or projection 142 on the coupling section 130 or 131 engages the recess or groove 143 in the foot 139, to hold and position the mold half 8 or 9. Rotative displacement of the mold halves 8 and 9 is prevented by movable projections or keys 144 forced into notches 144' in the ends of the feet 139 under the expansion of helical springs 145, 145 located below each key 144. The keys 144, 144 which are always partially contained within transverse slots 145' in the coupling sections 130 and 131 also have the function of forming a releasable lock for the mold halves 8 and 9. To this end, the keys 144 are provided with ears 146 extending into slots formed by external notches 147 in said coupling sections 130, 131 and matching notches 147' in the movable mold-support segments 132, 133, which ears 146 are engageable by a tool capable of pulling the keys 144 completely down into the coupling sections 130 and 131 and out of engagement with the feet 139. Because of the releasable feature of the coupling, there is no need, in the normal operation of the machine, for removing the coupling sections 130, 131 from the movable segments 132, 133, respectively. However, that operation can be performed, if need be, by removing screws 148 and disengaging the notched lips 149 of said coupling sections 130, 131 from the oblong ridges 149' along the opposed faces of the movable segments 132, 133.

At the time the mold carrier 5 advances the molds into operative relation to sagging gobs of glass projecting below the ribbon conveyor 3, the mold halves 8 and 9 are in separated relation determined by the positions of the segments 132 and 133 in the head end 134 of the mold support spindle 123, and the drive sprocket 124 or 124' is not being rotated. The slightly different form of successive sprockets 124 and 124' (Fig. 7), whereby one is elevated above the other, prevents interference between the teeth thereof when the links 111 of the mold carrier 110 pass about the end turns and the mold bodies are pivoted about pins 114. The advance of the mold carrier 5 along its operative run almost immediately brings the drive sprocket 124 or 124' into engagement with the first of a series of regularly spaced rollers 150 (Fig. 2) constituting the teeth of a normally fixed rack or rail section 151, and effects rotation of said sprocket 124 or 124' and a closing movement in the head segments 132, 133 and the mold halves 8 and 9. The rotation of sprocket 124 (or 124') is transferred through spindle 125 and the meshing gears 128, 129 to the shaft 136 within the mold support spindle 135 and turns a gear 152 in engagement with racks 153 and 154 attached to the segments 132 and 133 respectively so that said segments 132 and 133, and the mold halves 8 and 9 indirectly mounted thereon, are pulled toward each other. Quadrant shaped lips 155, 155 on opposite sides of facing portions of the segments 132 and 133 sweep over the top surface of a cover plate 156 on the head end 134 of the mold support spindle 135 when the mold halves 8 and 9 close on each other and throw off broken glass and other extraneous material which may work its way through the clearance notches 157 (only one being shown) provided in said cover plate 156 for the connecting portions of the segments 132, 133 and the racks 153, 154 and into the slide ways 158 for said racks 153, 154. At the limit of movement, rollers, like that indicated at 159 and backed by a helical spring 160 in a well in the head end 134 of the spindle 135, pass onto the sloping shoulders 161 on the lower surface of the racks 153 and 154 and, by their pressure of engagement, hold the segments 132 and 133 and the mold halves 8 and 9 together.

During the interval of the closing movement of the mold halves 8 and 9, the mold support spindle 135 and, accordingly, the molds, are prevented from rotating with the shaft 136, which turns in the ball bearing 162 in the former, by the locking action of prongs or keys 163 (Figs. 2, 6 and 10) located within one of two directly opposite notches 164 in the periphery of the head end 134 of said mold support spindle 135. The prongs or keys 163 associated with the spindles 135, 135 of each link 111 of the mold carrier 110 project from opposite end portions of a slide 165 contained within a cavity in a block 166 fastened to the normally top surface of said link 111 and are forced against said spindles 135, 135 by the expansion of a helical spring 167 within an opening in said slide 165 and bearing against a depending tongue 168 on the stops 169 attached to one side of block 166. Channels 153' in the top surface of the block 166 have accommodated the racks 153 of the mold support segments 132 when the mold halves 8 and 9 were separated, whereas the corresponding channels 154' in the block 166' accommodate the racks 154 thereof at that time.

The molds take up the rotative motion of the shafts 136 the instant the mold halves 8 and 9 are brought together as the motion of the links 111, at that time, advances triggering means 170, located thereon to one side of the mold spindle assemblies 123, 123, into engagement with actuating means 171 along the run and thereby effects the withdrawal of the keys 163. The motion of the link 111 causes the roller 172 on the lever 173 of the triggering means 170 to strike the normally stationary cam 174 on the upper end of an arm 175 attached to the track 115 and thereby turns said lever 173 about the pin 176 so that the link 177 connected to its lower end by pin 178 pulls the slide 165 away from the mold spindle assemblies 123, 123. The link 177, which slides along the base of a depression in the link 111, effects engagement with the slide 165 through an upstanding lip 180 located within a transverse notch in the end portion of said slide 165 and retracts it to the extent that the depending lip 181 on the latch 182 drops into a second transverse notch 183 in said end portion and is in position to hold said slide 165 at said retracted position. During prior intervals and until the slide 165 is fully retracted, the latch 182 which is also pivoted on the pin 176 is prevented from moving downward, although under the constant pressure of spring 184, by a laterally projecting ear 185 (Fig. 9) on the lever 173 which forms a rest for projection 186 on the lower surface of the latch 182. A cover plate 187 attached to the link 111 and extending over the triggering means 170 forms the rest for the upper end of the spring 184 and prevents foreign matter from entering into and interferring with the operation of said means. The disengagement of the keys 163 from the spindle assemblies 123 causes the rotation of the drive gear 124 effected by contact with succeeding stationary rollers 150 along the run of the mold carrier 5 to rotate said spindle assemblies 123 inasmuch as the mold halves 8 and 9 are then in contact with each other and, accordingly, no relative motion can then occur between gear 152 and the racks 153 and 154.

The molds continue to be rotated during the still further advance of the mold carrier 5 until finally, when the bulb 10 is completely formed therein, the sprocket 124 passes from the last of the series of rollers 150. At that time, the direction of rotation of the sprocket 124 is reversed by its passage into engagement with the first of a second series of stationary rack teeth in the form of rollers 190 (Fig. 2) located along the path of travel of the mold bodies and on the opposite side thereof from rollers 150; and the triggering means 170 is caused to bring the keys 163 into locking arrangement with the spindle assemblies 123 so that the rotation of said sprocket 124 separates the mold halves 8 and 9. The rollers 190, like rollers 150, are mounted separately on independent rail or rack sections (191 in the present instance) within slide ways of a block 192 on an arm 193 and can be pushed back out of the course of movement of the sprockets 124 and 124' against the resistance of a helical spring 194 without injury should the spindle assemblies 123 inadvertently become locked or wedged in one position. A pivoted mounting in the form of rods 195 for arms 193 also allows the rollers 150 and 190 to be withdrawn from the path of movement of the sprockets 124, 124' should it be desirable to operate the machine without opening or closing the molds.

The triggering means 170 is actuated by the striking of the roller 172 on the upper end of the lever 173 against the cam 196 on the normally stationary arm 197 of actuating means 198 located along the presently traversed portion of the course of movement of the mold carrier 5 and forces said roller 172 and lever portion downward to the position (Figs. 2 and 10) they were located at when entering the operative run of the machine. The movement of the lever 173 brings the ear 185 thereof against the projection 186 of the latch 182, thereby forcing said latch 182 out of the notch 183 in the slide 165, and pushes the link 177 back so that said slide 165 and the keys 163 can advance toward the spindle assemblies under the expansion pressure of spring 167. The keys 163 enter one of the notches 164 in the heads 134 of the spindles 135 and prevent said spindles 135 from being rotated with the shafts 136 under the influence of the rotation of sprocket 124 or 124' so that the independent rotation of gears 152 separates the mold halves 8 and 9 by moving racks 153 and 154. At the limit of motion, the head sections 132 and 133 engage the stops 169 and 199 respectively which are correspondingly attached to the blocks 166 and 166' at opposite sides thereof. This operation completes the cycle occurring during the passage of the mold carrier 5 through the operative run of the machine and arranges the elements thereof again in the relation in which they started said run. Should the triggering means 170 be inoperative for some reason at the time it engages the actuating means 198, the cam 196 will be forced back as the support arm 197 therefor will swing about the pivot pin 200 in the bracket 201 against the resistance applied to the heel 202 of said arm 197 by the push pin 203 and the helical spring 204.

While we have described a preferred embodiment of our invention, it will be obvious to those skilled in the art that various changes and modifications may be made in the form and the arrangement of parts within the spirit and scope of the invention.

What we claim as new and desire to secure by Letters Patent of the United States is:

1. In a glass working machine for forming glass articles, the combination of a blow-head carrier comprised of a plurality of articulated links, means mounting said carrier for movement along a horizontal operative run, a pair of blow-heads mounted on each link and comprising separate body portions carrying hollow spindles movable therein to and from operative positions outwardly of said carrier, the body portions of individual blow-heads on each link being separately secured directly to said link in accurately spaced relationship, means interconnecting the spindles of the pair of blow-heads on each link for effecting simultaneous movement of said spindles with respect to the carrier, and means along the horizontal run of said carrier for actuating the said interconnecting means upon movement of the carrier.

2. In a glass working machine for forming glass articles, the combination of means for supporting and blowing glass along a horizontal operative run, a mold carrier comprised of a plurality of links, means mounting said carrier for movement along said horizontal run, a pair of molds each composed of separable halves, a pair of rotatable spindle assemblies mounted on each link, each spindle assembly comprising a rotatable hollow spindle, a pair of mold carriers provided with rack members and mounting a pair of said mold halves on each of said hollow spindles for movement to open or closed position and for rotation with said hollow spindle, and a rotatable shaft located within each said hollow spindle and carrying pinion means engageable with the said rack members for actuation of said mold carriers upon rotation of the shaft, means common to the spindle assemblies on each link for selectively preventing rotation of the said hollow spindles, common sprocket drive means mounted on each link and connected to rotate the shafts thereon, means located along the said horizontal run for actuating said sprocket drive means, and means also along the said horizontal run for rendering ineffective said spindle rotation-preventing means upon closure of the mold halves.

3. In a glass working machine for forming glass articles, the combination of means for supporting and blowing glass along a horizontal operative run, a mold carrier comprised of a plurality of links, means mounting said carrier for movement along said horizontal run, a pair of molds each composed of separable halves, a pair of rotatable spindles assemblies mounted on each link, each spindle assembly comprising a hollow rotatable spindle having an exteriorly notched head end, a pair of mold carriers provided with rack members and mounting a pair of said mold halves on the head end of each of said hollow spindles for movement to open or closed position and for rotation with said hollow spindle, a rotatable shaft located within each said hollow spindle and carrying pinion means engageable with said rack members for actuation of said mold carriers upon rotation of the shaft, a slide retained by each link and having keys for projecting into the notches in the heads of the spindles at one position thereof for locking said spindles against rotation, common sprocket drive means mounted on each link and connected to rotate the shafts thereon, means mounted along the said horizontal run for actuating said sprocket drive means, and means also along said horizontal run for effecting retraction of said slide upon closure of the mold halves to permit rotation thereof.

4. In a glass working machine of the class described, a mold carrier comprising an endless chain of articulated links and means mounting said carrier for movement along a horizontal run, a pair of mold mechanisms mounted on each link, each of said mechanisms comprising a rotatable hollow spindle, a pair of mold carriers provided with rack members and carrying mold halves and mounted on each said spindle for movement to open or closed position and for rotation with said hollow spindle, a rotatable shaft located within each said hollow spindle and carrying a pinion meshing with the racks of the associated mold carrier, a common drive sprocket connected to effect rotation of both shafts of the mold mechanisms on each link, first and second rack members located along successive portions of the said horizontal run and on opposite sides of the line of travel of the drive sprockets and alternately engaged by said sprockets, the first rack member effecting rotation of said sprockets in a direction to first close the mold halves and to then rotate them, the second rack member effecting rotation of the sprockets in the reverse direction to open the mold halves, key means mounted on each link for movement into and out of locking relationship with the associated hollow spindles on said link, and means along said horizontal run for effecting unlocking of said key means upon closing of said mold halves to permit rotation thereof and for effecting locking of said key means upon engagement of said drive sprocket with the said second rack member to effect opening of the mold halves.

References Cited in the file of this patent

UNITED STATES PATENTS

| 626,655 | Guillaume et al. | June 6, 1899 |
| 1,727,221 | Searle | Sept. 3, 1929 |
| 1,790,397 | Woods et al. | Jan. 27, 1931 |
| 1,833,284 | Gray | Nov. 24, 1931 |
| 1,943,195 | Van Ness | Jan. 9, 1934 |
| 2,184,900 | Snyder | Dec. 26, 1939 |
| 2,290,798 | Berthold | July 21, 1942 |
| 2,329,146 | Teichmann | Sept. 7, 1943 |
| 2,357,702 | Teichmann | Sept. 5, 1944 |
| 2,388,876 | Smith | Nov. 13, 1945 |
| 2,556,237 | Teichmann | June 12, 1951 |

FOREIGN PATENTS

| 283,870 | Great Britain | June 14, 1928 |
| 615,487 | Germany | July 3, 1935 |

OTHER REFERENCES

Metals Handbook, 1948 ed., pages 601, 602, publ. by Amer. Soc. for Metals, Cleveland, Ohio.